United States Patent
Lue et al.

(10) Patent No.: US 10,282,346 B1
(45) Date of Patent: May 7, 2019

(54) SCALABLE NETWORK DEVICE SELF-CONFIGURATION IN LARGE NETWORKS

(71) Applicant: CISCO TECHNOLOGY, INC., San Jose, CA (US)

(72) Inventors: Allan Lue, Saratoga, CA (US); Stephanie Yen Wong, San Jose, CA (US); Srividya S. Vemulakonda, San Jose, CA (US); Edward Tung Thanh Pham, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 517 days.

(21) Appl. No.: 14/289,473

(22) Filed: May 28, 2014

Related U.S. Application Data (60) Provisional application No. 61/936,215, filed on Feb. 5, 2014.

(51) Int. Cl.
*G06F 15/177* (2006.01)

(52) U.S. Cl.
CPC ................. *G06F 15/177* (2013.01)

(58) Field of Classification Search
CPC .................................................. G06F 15/177
USPC ........................................................ 709/220
See application file for complete search history.

(56) References Cited

U.S. PATENT DOCUMENTS

| | | | | |
|---|---|---|---|---|
| 6,314,565 B1* | 11/2001 | Kenner | ..................... | G06F 8/65 717/171 |
| 7,293,078 B2* | 11/2007 | Danforth | ................. | H04L 29/06 709/203 |
| 7,363,260 B1* | 4/2008 | Stamler | ................ | G06Q 10/087 705/28 |
| 8,130,677 B2* | 3/2012 | Barker | ................ | H04L 12/2807 370/255 |
| 8,838,951 B1* | 9/2014 | Hicks | .................... | H04L 63/105 705/7.27 |
| 8,874,755 B1* | 10/2014 | Deklich | ................ | G06F 15/177 709/226 |
| 9,306,806 B1* | 4/2016 | Zhang | ................. | H04L 41/0853 |
| 2002/0069213 A1* | 6/2002 | Moslander | ................ | G06F 8/65 |
| 2006/0080659 A1* | 4/2006 | Ganji | ........................ | G06F 8/61 717/178 |
| 2006/0168322 A1* | 7/2006 | Gray | ..................... | H04L 41/082 709/238 |
| 2009/0198804 A1* | 8/2009 | Danforth | ................. | H04L 63/10 709/221 |
| 2010/0131622 A1* | 5/2010 | Brewis | .................. | H04L 67/303 709/221 |

(Continued)

*Primary Examiner* — Chris Parry
*Assistant Examiner* — Antony K Clayborn
(74) *Attorney, Agent, or Firm* — Polsinelli PC (57) ABSTRACT

In accordance with one example embodiment, there is provided a method for accessing a configuration database file corresponding to a network comprising a network device and using a device identifier of the network device as a key to the configuration database file to access a file entry containing configuration information for the network device. The configuration information may include identification of a configuration template file and at least one network parameter. The method may further include applying the at least one network parameter to the template file to create a configuration file and configuring the network device using the configuration file.

17 Claims, 6 Drawing Sheets

(56) References Cited

U.S. PATENT DOCUMENTS

| | | | |
|---|---|---|---|
| 2010/0180016 A1* | 7/2010 | Bugwadia | G06F 9/4411 |
| | | | 709/220 |
| 2011/0004937 A1* | 1/2011 | Staats | H04L 41/082 |
| | | | 726/24 |
| 2012/0016970 A1* | 1/2012 | Shah | G06F 9/45558 |
| | | | 709/220 |
| 2012/0036234 A1 | 2/2012 | Staats et al. | |
| 2013/0132532 A1* | 5/2013 | Zhang | H04L 41/0823 |
| | | | 709/220 |
| 2013/0198346 A1* | 8/2013 | Jubran | H04L 41/12 |
| | | | 709/220 |
| 2013/0297759 A1 | 11/2013 | Staats et al. | |
| 2013/0322453 A1* | 12/2013 | Allan | H04L 12/4662 |
| | | | 370/395.53 |
| 2014/0115129 A1* | 4/2014 | Chaudhari | H04L 29/06027 |
| | | | 709/221 |
| 2014/0122674 A1* | 5/2014 | Gray | H04L 41/0846 |
| | | | 709/222 |

* cited by examiner

```
[FOC1722R01J]  ──102
template_to_use = poap_leaf_single_tenant_template_n6k.cfg
HOST_NAME = N6k-5
BGP_RR_IPADDR = 44.2.0.100
BACKBONE_IPADDR = 43.2.1.56/24
MGMT_IP = 90.90.1.67/24
BGP_ROUTER_ID = 43.2.1.56
BACKBONE_IPV6_ADDRESS = 2001:1::239/64
XMPP_SERVER_NAME = host-167-mgmt.cisco.com
XMPP_SERVER_IPADDR = 90.90.1.167
XMPP_DEVICE_PASSWORD = data center
XMPP_GROUP1 = neF_global
BACKBONE_VLAN = 100
```

```
license grace-period
hostname %host_name install feature-set fabric
feature-set fabric
feature fabric forwarding <snip>
interface Vlan %backbone_vlan
  no shutdown
  ip address %backbone_ipaddr
  ipv6 address %backbone_ipv6_address
  fabric forwarding control-segment
```

```
subnet 172.18.217.0 netmask 255.255.255.0 {
  option domain-name-servers 64.102.6.247;
  option subnet-mask 255.255.255.0;
  option routers 172.18.217.1;
  range 172.18.217.2 172.18.217.99;
    option tftp-server-name "172.18.217.249";
    option bootfile-name "/poap_fabric.py":

```
#!bin/env python
#md5sum="eca9789358f38226c753922c7cd69dac"

import syslog

# Host name and user credentials for config file download
username = "poap"
password = "poap123"
hostname = "90.90.90.166"

# POAP can use 6 modes to obtain the config file.
# - 'poap_static' - file is statically specified
# - 'poap_location' - CDP neighbor of interface on which DHCPDISCOVER arrived
#                    is used to derive the config file
# - 'database' - config file is obtained from a database
config_file_type = "database"

# Config File Infos #######
# Source file name of Config file
config_db_file_src = "poap_database.cfg"
```

- Credentials for TFTP or SCP server where images and configuration file is located.
- Configuration file name determination
- database file name when using database mode

FIG. 7B

SCALABLE NETWORK DEVICE SELF-CONFIGURATION IN LARGE NETWORKS

CROSS-REFERENCE TO RELATED APPLICATION

This application claims the benefit of priority under 35 U.S.C. 119(e) of U.S. Provisional Patent Application Ser. No. 61/936,215, entitled "SCALABLE NETWORK DEVICE SELF-CONFIGURATION IN LARGE NETWORKS", filed Feb. 5, 2014, which is hereby incorporated by reference in its entirety.

TECHNICAL FIELD

This disclosure relates in general to the field of communications networks and, more particularly, to a technique for scalable self-configuration of network devices in such networks.

BACKGROUND

As dependence on the Internet, mobile communication, and cloud computing for both personal and business applications continues to grow, so must the size of networks for implementing these functions. Specifically, today's networks may be implemented using hundreds or hundreds of thousands of network devices, such as switches and routers. Initial provisioning and subsequent daily maintenance of such large scale networks is a daunting task, as in many cases it necessitates that a network administrator manually provision and maintain configuration of each network device.

Some network administrators elect to employ scripts to manage and download configurations into network devices. While such scripts basically automate portions of the repetitive tasks, most of the critical decisions, such as which configuration each network device is to receive, must still be made by the administrator. As a result, the process remains labor intensive and error prone.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In accordance with one example embodiment, there is provided a method for accessing a configuration database file corresponding to a network comprising a network device and using a device identifier of the network device as a key to the configuration database file to access a file entry containing configuration information for the network device. The configuration information may include identification of a configuration template file and at least one network parameter. The method may further include applying the at least one network parameter to the template file to create a configuration file and configuring the network device using the configuration file.

The method may further include retrieving the configuration template file from a location indicated in the file entry and saving the configuration file to a storage location. Some embodiments include retrieving the device Identifier from the network device. In certain embodiments, the device identifier is one of a serial number of the network device and a MAC address of the network device. The network parameter may include at least one of a hostname of the network device, a management interface IP address of the network device, a BGP IP address of the network device, and at least one server IP address for the network device. The method may further include storing the configuration database file in a centralized database.

EXAMPLE EMBODIMENTS

In one embodiment, the present disclosure introduces an automatic, customizable, scalable, and hierarchical framework in network operating systems, such as IOS and NXOS available from Cisco Systems, Inc., of San Jose, Calif., to provision and maintain all of the switches and routers that make up a large scale communications network. In this embodiment, at the beginning of network device boot-up, the device will query, via a simple protocol such as Trivial File Transfer Protocol ("TFTP"), a configuration database file that is keyed on, or indexed by, a unique identifier for the network device, such as a serial number or MAC address, to retrieve a list of parameters specific to the device. In certain embodiments, the list of parameters may include, for example, the name of the device, the IP address of the device, paths to or names of files containing a configuration template, paths to or names of files containing additional configuration information, and so on. The retrieved configuration template with the retrieved parameters inserted therein is then applied to the network device. This process simplifies the network administrator's provisioning task to the maintaining of a single database file containing a record for each network device. Additionally, the process vastly simplifies and speeds up the processes of provisioning and configuring network devices by minimizing repetitive manual processes and reducing the likelihood of human error. In certain embodiments, multiple templates may be used; for example, there may be one template for configuration of a node as a leaf node, another template for configuration of a node as a spine node, and perhaps yet another template for configuration of a node as a border leaf node.

Figure 1:
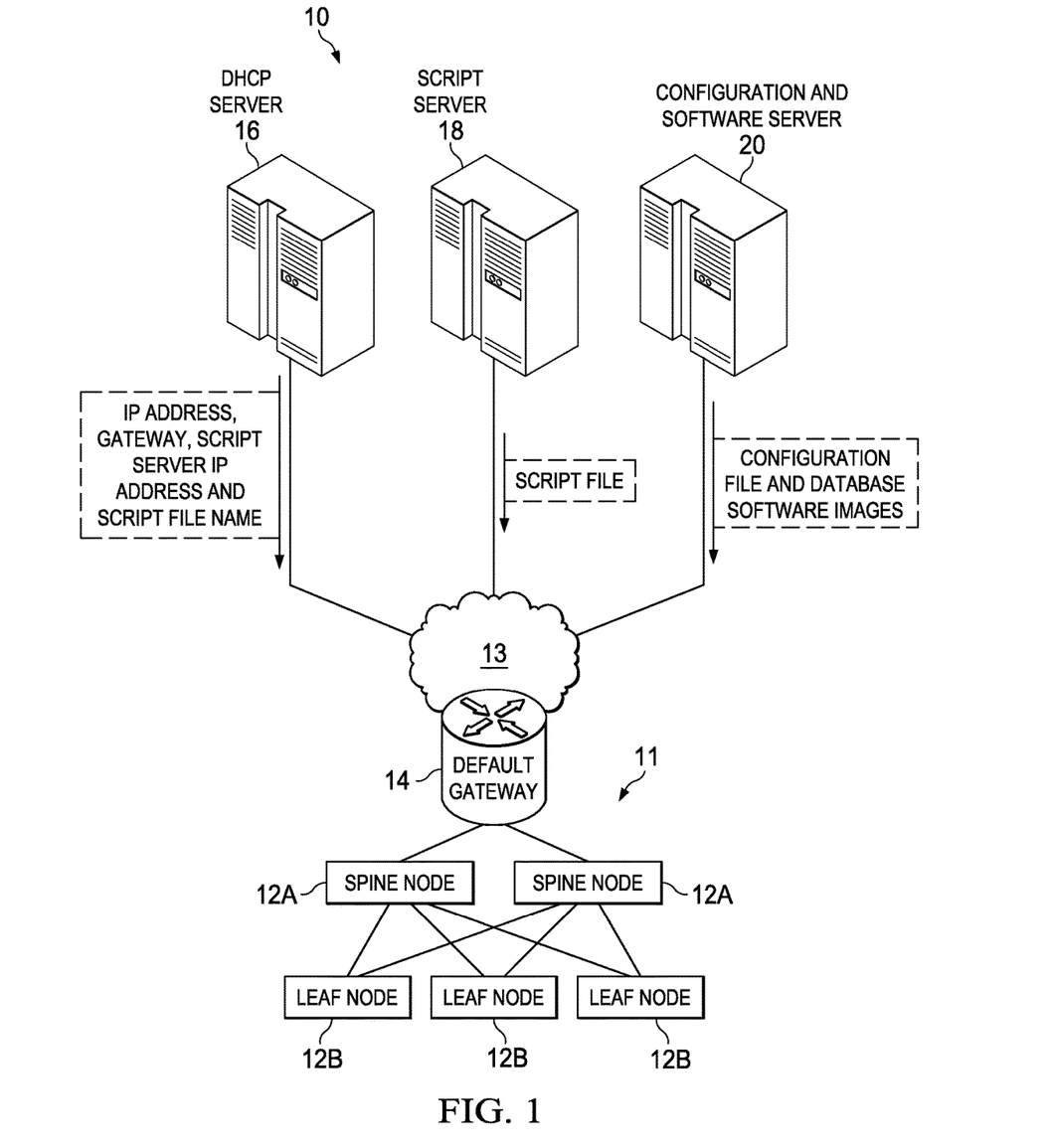
FIG. 1 is a simplified block diagram illustrating a communications network 10 in which an example Power On Auto Provisioning ("POAP") process may be implemented in accordance with embodiments described herein in the context of a Data Fabric Architecture ("DFA")

FIG. 1 is a block diagram of a communications network 10 in which an example Power On Auto Provisioning ("POAP") process may be implemented in accordance with embodiments described herein in the context of a Data Fabric Architecture ("DFA") 11. In general, POAP automates the process of upgrading software images and installing configuration files on a network device, such as a switch, being deployed in a network for the first time. When a network device with POAP capabilities boots and does not find its startup configuration installed thereon, the network device enters POAP mode, locates a Dynamic Host Configuration Protocol ("DHCP") server and bootstraps itself with its interface IP address, gateway, and Domain Name System ("DNS") server IP addresses. It also obtains the IP address of a script server, such as a Trivial File Transfer Protocol ("TFTP") server or the Uniform Resource Locator ("URL") of a HyperText Transfer Protocol ("HTTP") server, and downloads from the script server a configuration script that is run on the network device. The configuration script executes on the network device to download from one or more servers and install on the network device the appropriate software image and configuration file. It should be noted that the network device's DHCP information is used only during POAP.

As shown in FIG. 1, the DFA 11 includes a plurality of spine nodes, represented in FIG. 1 by spine nodes 12A, and a plurality of leaf nodes, represented in FIG. 1 by leaf nodes 12B. Each of the spine nodes 12A is connected to each of the leaf nodes 12B. Additionally, although not explicitly illustrated in FIG. 1, one or more of the leaf nodes 12B may function as border leaf nodes. As will be described in greater detail below, the DFA 11 may interface with a cloud network 13 via a gateway device 14. As apparent from the foregoing, and as illustrated in FIG. 1, to implement POAP on a network device comprising one of the nodes 12A, 12B, communications network 10 may include a DHCP server 16 for providing the interface IP address, address of the default gateway 14, and script server IP address and script file name and/or script file location information. Communications network 10 may also include a script server 18, which may be implemented as a TFTP server or a HTTP server. The script server stores and provides the POAP configuration script used to automate the software image installation and configuration process for each network device 12A, 12B. Communications network 10 may also include one or more configuration and software servers, represented in FIG. 1 by a File Transfer Protocol ("FTP") server 20, containing the desired software images and configuration files. It should be noted that although the communications network 10 is illustrated as including three separate servers 16, 18, and 20, two or more of the servers could be combined into a single device without departing from the spirit of embodiments described herein.

In one embodiment, the POAP configuration script retrieves device-specific identifier, such as the serial number, and downloads and installs on the network device the software images file (including system and kickstart image files) if the files they do not already exist on the network device. The software image files are used at the next reboot. The POAP configuration script further schedules the download configuration to be applied at the next switch reboot, and stores the configuration as the startup configuration.

Figure 2:
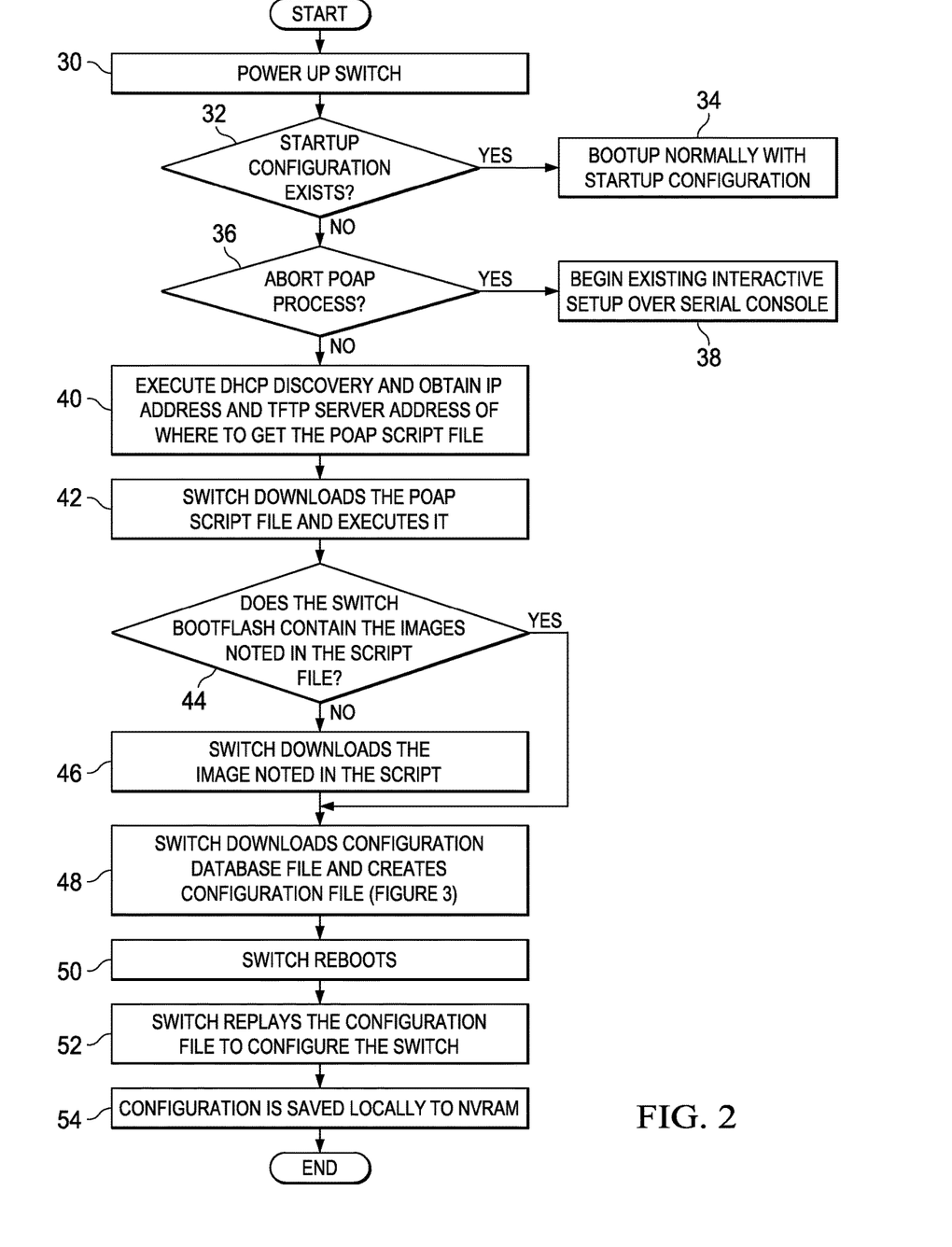
FIG. 2 is a flowchart illustrating an example POAP process in accordance with embodiments described herein.

In general, POAP has four phases, including power up, DHCP discovery, script execution, and post-installation reload. Within these phases, a variety of other processes are executed. FIG. 2 is a flowchart illustrating an example POAP process. In step 30, the network device is powered up. In step 32, a determination is made whether a startup configuration exists on the network device. If so, in step 34, the network device boots up in a normal fashion using the startup configuration. If in step 32 it is determined that a startup configuration does not exist on the network device, execution proceeds to step 36. In step 36, a determination is made whether to abort the POAP process. In particular, in certain embodiments, a network administrator may be given the option to abort the POAP process, which begins automatically on power on of the network device. If the network administrator proactively aborts POAP, in step 38, existing interactive setup of the network device is begun over the serial console and the network administrator can provision the network device manually through the user interface. If POAP is not aborted in step 36, in step 40, DHCP discovery is executed and the IP address and TFTP server address of where to locate the POAP script file are obtained. The name of the script file (also referred to as "bootfile") may also be provided in step 40.

In particular, in certain embodiments, during the DHCP discovery phase, the network device transmits DHCP discover messages on all of the active interfaces soliciting DHCP offers from the DHCP server or servers. The DHCP client on the network device uses the serial number in the client-identifier option to identify itself to the DHCP server. The DHCP server may use the identifier to determine what information, such as the IP address and configuration script file name, to send back to the DHCP client/network device.

The DHCP discover message may also solicit the TFTP server name or TFTP server address and script file name from the DHCP server. In particular, the TFTP server name or TFTP server address is relayed from the DHCP server to the DHCP client. The DHCP client uses the information to contact the TFTP server to obtain the script file. The script file name includes the complete path to the script file on the TFTP server. The DHCP client uses this information to download the script file. When multiple DHCP offers that meet the requirement are received, an offer is randomly chosen. The network device completes the DHCP negotiation (request and acknowledgment) with the selected DHCP server, and the DHCP server assigns an IP address to the network device. If there is a failure in any of the subsequent steps in the POAP process, the IP address is released back to the DHCP server. If no DHCP offers meet the requirements, the network device does not complete the DHCP negotiation and an IP address is not assigned.

In step 42, the network device downloads the POAP script file and executes it. During script execution phase, once the network device has bootstrapped itself using the information in the DHCP acknowledgement, the script file is downloaded from the TFTP server or the HTTP server. In step 44, a determination is made whether the network device bootflash contains the image noted in the script file. If not, execution proceeds to step 46, in which the script downloads the image noted in the script file. Upon completion of step 46, or upon a positive determination in step 44, execution proceeds to step 48. In step 48, the network device downloads the configuration database file from the configuration server and generates the configuration file using the corresponding database entry and appropriate template file (as described in connection with FIG. 3 below). In step 50, the switch reboots. In step 52, the network device replays the configuration file to configure the switch. In step 54, the configuration is saved locally to non-volatile memory of the switch.

POAP provides operational ease of deployment; no user involvement is required. The intelligence in the network device and configuration and upgrade decisions are made depending on the environment. The network environment may include a DHCP/TFTP/FTP server (Linux/Windows/OS agnostic) having installed thereon a customizable configuration script (e.g., TCL or Python) and a file with database, configuration templates, kickstart, and system NX-OS images. The network environment may further include a DHCP relay on L3 gateway. DHCP requests are sent out over management or inband interfaces.

Figure 3:
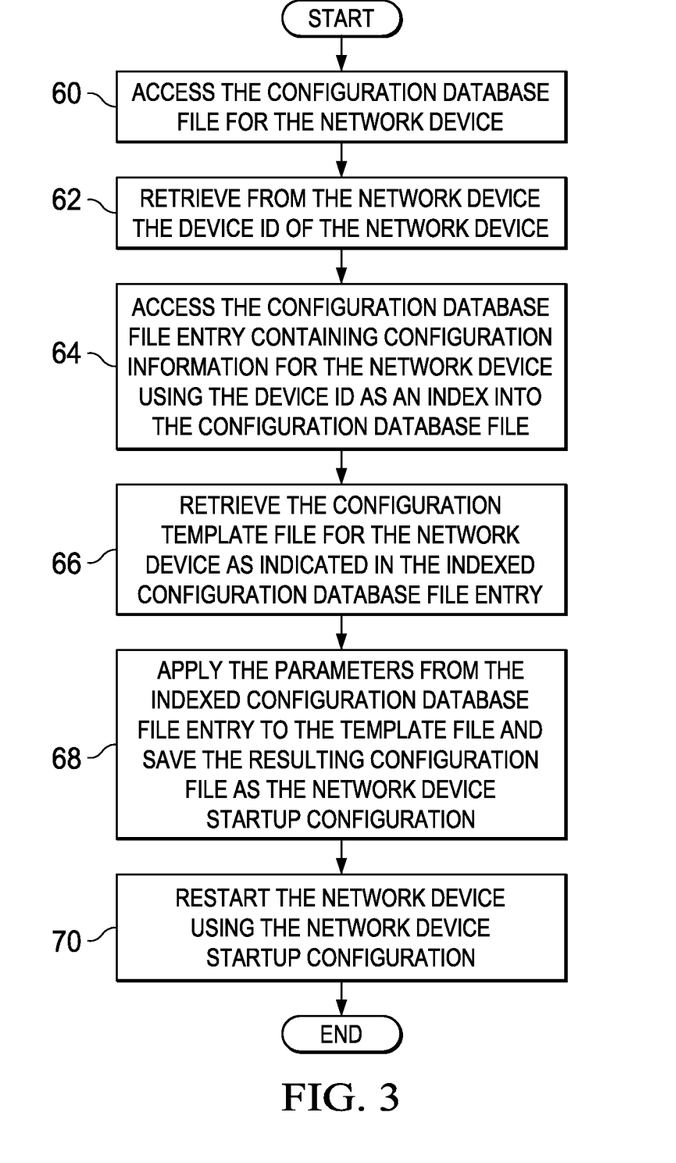
FIG. 3 is a flowchart illustrating operation of a process acquiring a configuration file during a POAP process in accordance with embodiments described herein.

When a network device is powered up for the first time, the network device loads the software image installed during manufacturing and tries to find a configuration file from which to boot. When no configuration file is found, POAP mode begins. In certain embodiments, no user intervention is required for POAP to initiate and complete. In accordance with features of embodiments described herein, the network device bootstrap process may be configured to execute a configuration acquisition process at the beginning of the boot process, right after bootstrap network connection is established. During the configuration acquisition process, the network device will connect to a server, such as a TFTP server, and download a configuration acquisition script. FIG. 3 illustrates a flowchart of the process initiated by the configuration acquisition step. Referring to FIG. 3, in step 60, a configuration database file for the network device is accessed. In one embodiment, the configuration database file is stored in the configuration server and may comprise either a database file or a text file. In step 62, the network device ID is retrieved from the network device. The network device ID may include the MAC address and/and serial number of the device. In step 64, the device ID retrieved in step 62 is used as an index into the configuration database file to access the file entry, or database record, corresponding to the network device and containing configuration information for the network device. In this context, such configuration information may include one or more of the path to a configuration template file (e.g., "leaf node template," "spine node template") to be used for the device and other key network parameters, such as hostname (e.g., "switch123"), management interface IP address, BGP IP address, and various server IP addresses (e.g., LDAP server IP address, XMPP server IP address). In step 66, the configuration template file for the network device (as identified in the database file entry) is retrieved from the configuration server. In step 68, the parameters from the configuration database file entry are applied to the configuration template file and the resulting configuration file is saved as the device start up configuration. In step 70, the network device is restarted using the device start up configuration.

Given that the configuration database file is a primary component of this framework, provisioning of the database file should be carefully planned to maximize the benefits of the embodiments described herein. For example, it may be advisable to begin creation of the database file with a file that already contains all unique identifiers (e.g., serial number or MAC addresses) for all of the network devices in the network of interest. For a new data center, the purchase order or shipment invoice may be a good choice, as it will typically contain the serial number, MAC address, hardware revision number and/or price for each of the network devices. Additionally and/or alternatively, almost all data centers maintain an equipment inventory list, which will likely contain device information similar to that provided in an invoice and may be used as the starting point for the database file. It may be advisable to limit the information included in the database file to that which is relevant to provisioning (e.g., MAC address, HW revision number, etc.). Moreover, the file should be formatted in a manner such that it can be read by the provisioning script. Necessary fields, such as hostname and/or management interface IP address, for example, should be added to each configuration database file entry. The configuration database file may then be stored in a location where it may be retrieved by the configuration acquisition script. At this point, the provisioning infrastructure is ready for testing.

Figure 4:
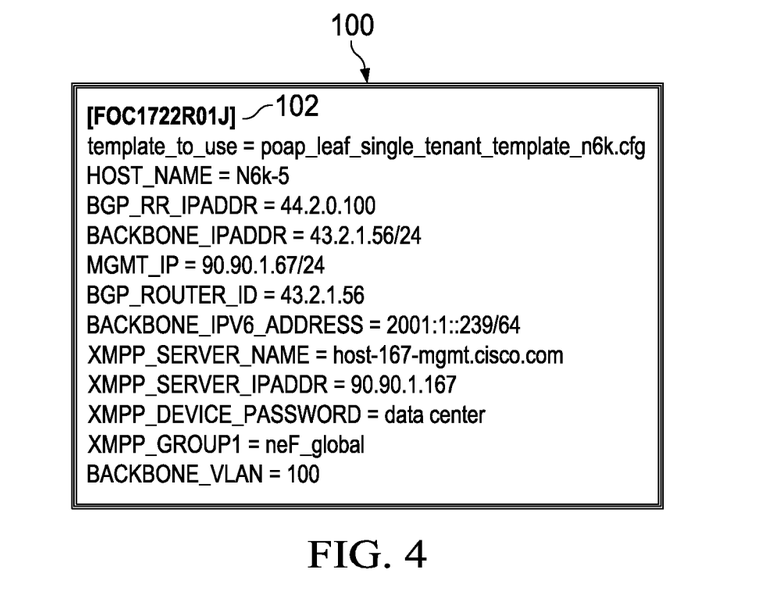
FIG. 4 illustrates an example form of an entry of a configuration database file in accordance with embodiments described herein.

FIG. 4 illustrates an example form of an entry 100 of a configuration database file in accordance with one embodiment. As shown in FIG. 4, the entry 100 includes a device ID 102, an indication of the name of the configuration template to use ("poap_leaf_single_tenant_template_n6k.cfg") for the network device identified by the device ID 102 ("FOC1722R01J"), and other values for various parameters, including Host Name ("N6k-5"), Backbone VLAN ("100"), Backbone IP Address ("43.2.1.56/24"), and Backbone IPv6 Address ("2001:1::239/64"), among others.

Figure 5:
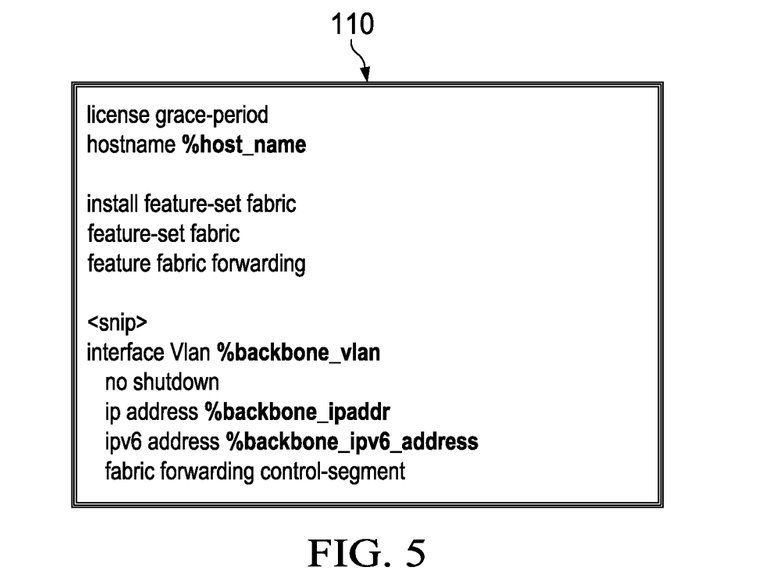
FIG. 5 illustrates an example template configuration file in accordance with embodiments described herein.

FIG. 5 illustrates an example template configuration file 110. Variables are preceded by "%" and will be replaced by the corresponding value defined in the database configuration file. For example, assuming the template configuration file 110 is designated "poap_leaf_single_tenant_template_n6k.cfg", using the entry 100 illustrated in FIG. 4 as an example, variable "% host_name" will be replaced by "N6k-5", variable "% backbone_vlan" will be replaced by "100", variable "% backbone_ipaddr" will be replaced by "43.2.1.56/24", and variable "% backbone_ipv6_address" will be replaced by "2001:1::239/64" in the configuration file for the network device identified by device ID FOC1772R01J. As previously noted, in certain embodiments, multiple templates may be used; for example, there may be one template for configuration of a node as a leaf node, another template for configuration of a node as a spine node, and perhaps yet another template for configuration of a node as a border leaf node. The purpose of the template is to include as much of the commonality among types of nodes in the template as static information ("constants") and to allow for dynamic information to be represented by variables to be replaced by values in the corresponding configuration file entry. There is no particular limit to the number of template files that may be used; however, for purposes of economy and scalability, it would be advisable to use as few as possible.

Figure 6:
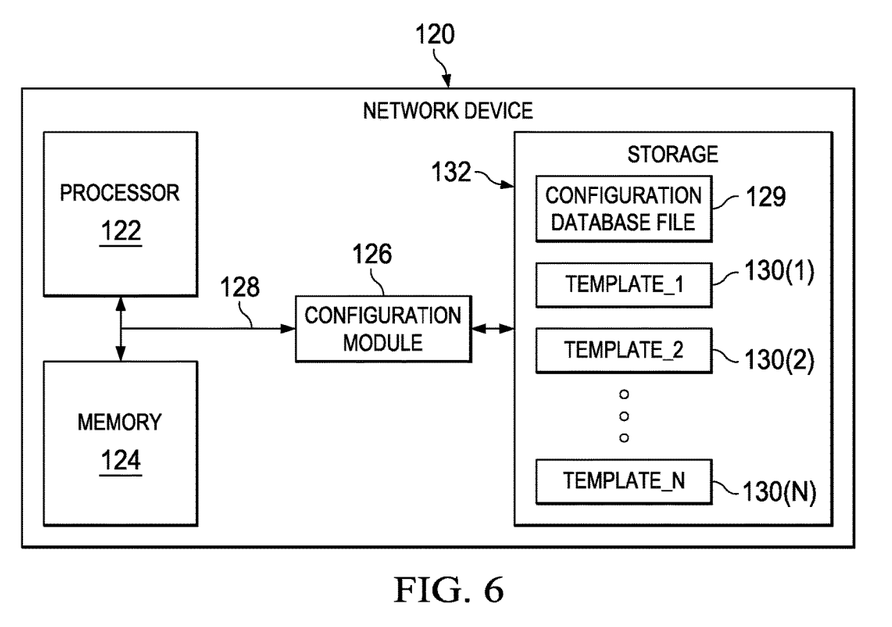
FIG. 6 is a simplified block diagram of a DFA network node in accordance with embodiments described herein.

FIG. 6 illustrates a simplified block diagram of an example network device 120, such as the nodes 12A, 12B, of FIG. 1. As shown in FIG. 6, the network device 120 includes at least one processor 122, at least one memory element 124, and a configuration module 126, all interconnected via a system bus 128.

The memory element 124 comprises a plurality of storage locations that are addressable by the processor 122 for storing software programs and data structures associated with the embodiments described herein. The processor 122 may include hardware elements or hardware logic adapted to execute software programs, such as embodied in configuration module 126, and manipulate data structures in the memory element 124. The configuration module 126 may comprise processes and/or services as described herein and may interact with and manipulate a configuration database file 129 and a template file 130 corresponding to the device

120. Although not shown, it will be recognized that configuration files may also be stored in storage location 132 of the device 120 along with files 129 and 130.

Figure 7A:
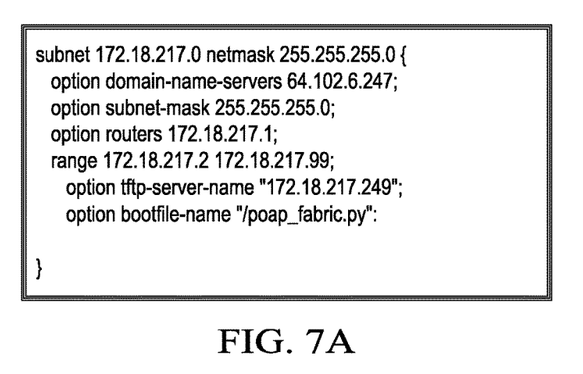
FIG. 7A illustrates an example implementation of DHCP server configuration file with TFTP option in accordance with embodiments described herein.

Configuration details for implementation of PoAP in a DFA environment may include a script file (poap_fabric.py or poap_fabric.tcl located in /tftpboot), an FTP server with NX-OS image, an FTP server with database file and configuration templates, and DHCP server with TFTP option, an example of which is illustrated in FIG. 7A.

Figure 7B:
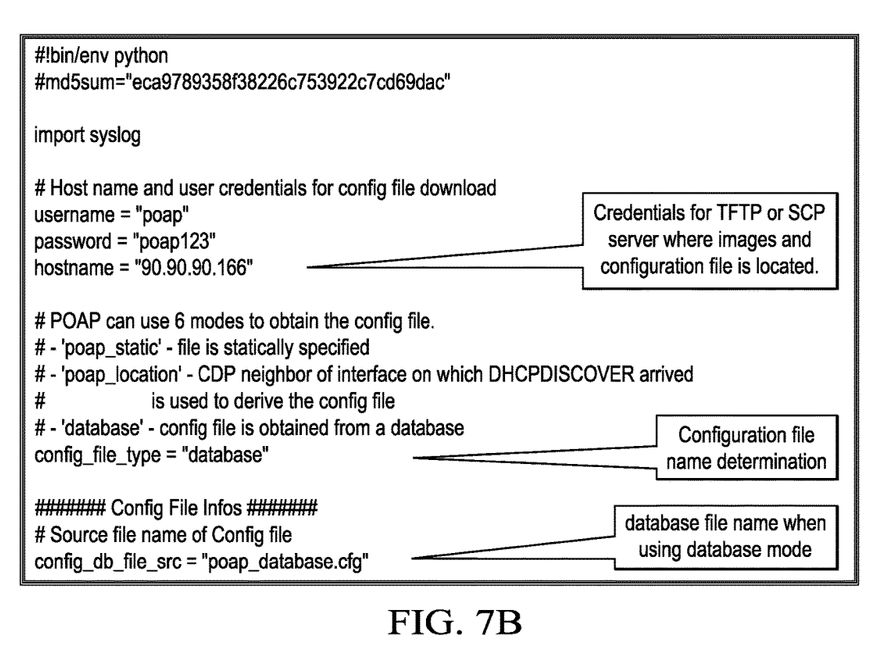
FIG. 7B illustrates an example script for use in implementing embodiments described herein.

With regard to the poap_fabric.py script file, the name of the file is not important, so long as the file name exists in the TFTP server directory path that is noted in the DHCP offer. An MD5 checksum may optionally be used to verify file integrity. The script file will provide login credentials for the switch to use when downloading the images and configuration files to the switch. To use the configuration database described herien, a new "database" mode may be implemented (in addition to the existing "static," "serial_number," "location," "hostname," and "mac" modes) in which the network device will use its serial number or management interface MAC address to perform database lookup. The lookup will yield the template and pairs of variable/value to derive a final configuration file to apply to the device. The script is offered for minimum functionality and can be enhanced as desired to meet particular network requirements. An example poap_fabric.py script is illustrated in FIG. 7B.

Although embodiments have been shown and described in connection with configuration of network devices, it will be recognized that the techniques described herein are equally applicable to network maintenance and other applications in which a network device, such as a spine, leaf, and/or border leaf node, is rebooted and/or reconfigured. In summary, the above-described embodiments operate to program a network device to retrieve per-device configuration information from a centralized database file at the beginning of the boot process. Both the configuration template file path and parameters to be passed into the template for instantiation can be stored in the database. The embodiments reduce network provisioning to a simple task of maintaining a configuration database file with one structured entry for each network device. It thereby drastically simplifies provisioning of network devices while simultaneously reducing human error.

Although embodiments described herein have been described with reference to a system in which the configuration database file is downloaded to a network device, which accesses the appropriate template file, populates it with parameters from the corresponding configuration database file entry, and creates the configuration file to be applied to the device, it will be recognized that this process may be performed externally to the network device, such as by the configuration server, with the final configuration file itself being downloaded to and applied by the device during boot up. In that case, much of the process described with reference to FIG. 3 would be performed by the external device. Additionally, while embodiments have been described in which a configuration database file entry includes at least one variable/parameter, it will be recognized that in an extreme case, the configuration database file may include no parameters, in which case the template file would be customized for a single network device.

It should be noted that much of the infrastructure discussed herein can be provisioned as part of any type of network device. As used herein, the term "network device" can encompass computers, servers, network appliances, hosts, routers, switches, gateways, bridges, virtual equipment, load-balancers, firewalls, processors, modules, or any other suitable device, component, element, or object operable to exchange information in a communications environment. Moreover, the network devices may include any suitable hardware, software, components, modules, interfaces, or objects that facilitate the operations thereof. This may be inclusive of appropriate algorithms and communication protocols that allow for the effective exchange of data or information.

In one implementation, these devices can include software to achieve (or to foster) the activities discussed herein. This could include the implementation of instances of any of the components, engines, logic, modules, etc., shown in the FIGURES. Additionally, each of these devices can have an internal structure (e.g., a processor, a memory element, etc.) to facilitate some of the operations described herein. In other embodiments, the activities may be executed externally to these devices, or included in some other device to achieve the intended functionality. Alternatively, these devices may include software (or reciprocating software) that can coordinate with other elements in order to perform the activities described herein. In still other embodiments, one or several devices may include any suitable algorithms, hardware, software, components, modules, interfaces, or objects that facilitate the operations thereof.

In certain example implementations, the functions outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

In one example implementation, various nodes involved in implementing the embodiments described herein can include software for achieving the described functions. For example, referring again to FIG. 6, the configuration module 126 may comprise software embodied in one or more tangible media for facilitating the activities described herein. Memory element 124 may store information to be used in achieving the functions as outlined herein. Additionally, processor 122 is capable of executing software or an algorithm (such as embodied in configuration module 126) to perform the functions as discussed in this Specification and particularly as illustrated in FIG. 3. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method of Power On Auto Provisioning ("POAP") performed in connection with a first network device, comprising:
   powering up the first network device;
   booting up the first network device using a startup configuration in response to the powering up and the startup configuration being present on the first network device;
   first downloading, in response to at least a startup configuration not being present on the first network device, a POAP script file;
   determining if a bootflash of the first device contains any images identified in the downloaded POAP script file;
   second downloading, in response to a negative result of the determining, the images identified in the downloaded POAP script file;
   creating, after the second downloading or a positive response to the first downloading, a configuration file to configure the first network device, comprising:
      accessing a configuration database file corresponding to a network comprising a plurality of network devices including the first network device, wherein the configuration database file includes a file entry corresponding to each of the network devices;
      accessing the file entry corresponding to the first network device using a device identifier of the first network device as an index to the configuration database file, wherein the corresponding file entry includes configuration information for the first network device, the configuration information comprising information identifying a location of a configuration template file and at least one network parameter;
      retrieving the identified configuration template file from the location identified in the corresponding file entry;
      applying the at least one network parameter to the identified configuration template file to create a new configuration file; and
      rebooting the first network device using the new configuration file;
   wherein each of the network devices comprises a network switching element; and
   wherein the network is a Data Fabric Architecture ("DFA") network.

2. The method of claim 1, further comprising saving the configuration file to a storage location.

3. The method of claim 1, further comprising retrieving the device identifier from the network device.

4. The method of claim 1, where in the device identifier comprises one of a serial number of the network device and a MAC address of the first network device.

5. The method of claim 1, wherein the at least one network parameter comprises at least one of a hostname of the network device, a management interface IP address of the network device, a BGP IP address of the network device, and at least one server IP address for the first network device.

6. The method of claim 1, further comprising storing the configuration database file in a centralized database.

7. One or more non-transitory tangible media that includes code for execution and when executed by a processor is operable to perform Power On Auto Provisioning ("POAP") operations in connection with a first network device, the operations comprising:
   powering up the first network device;
   booting up the first network device using a startup configuration in response to the powering up and the startup configuration being present on the first network device;
   first downloading, in response to at least a startup configuration not being present on the first network device, a POAP script file;
   determining if a bootflash of the first device contains any images identified in the downloaded POAP script file;
   second downloading, in response to a negative result of the determining, the images identified in the downloaded POAP script file;
   creating, after to the second downloading or a positive response to the first downloading, a configuration file to configure the first network device, comprising:
      accessing a configuration database file corresponding to a network comprising a plurality of network devices including the first network device, wherein the configuration database file includes a file entry corresponding to each of the network devices;

accessing the file entry corresponding to the first network device using a device identifier of the first network device as an index to the configuration database file, wherein the corresponding file entry includes configuration information for the first network device, the configuration information comprising information identifying a location of a configuration template file and at least one network parameter;

retrieving the identified configuration template file from the location identified in the corresponding file entry;

applying the at least one network parameter to the identified configuration template file to create a new configuration file; and rebooting the first one of the network device using the new configuration file;

wherein each of the network devices comprises a network switching element; and wherein the network is a Data Frabric Architecture ("DFA") network.

8. The media of claim 7, wherein the operation further comprises saving the configuration file to a storage location.

9. The media of claim 7, wherein the operations further comprise retrieving the device identifier from the first network device.

10. The media of claim 7, wherein the device identifier comprises one of a serial number of the network device and a MAC address of the first network device.

11. The media of claim 7, wherein the at least one network parameter comprises at least one of a hostname of the network device, a management interface IP address of the network device, a BGP IP address of the network device, and at least one server IP address for the network device.

12. The media of claim 7, wherein the operation further comprise storing the configuration database file is a centralized database.

13. An apparatus, comprising:
a memory element configured to store data;
a processor operable to execute instructions associated with the data; and
a configuration module configured to execute Power On Auto Provisioning ("POAP") in connection with a first network device, comprising:
powering up the first network device;
booting up the first network device using a startup configuration in response to the powering up and the startup configuration being present on the first network device;

first downloading, in response to at least a startup configuration not being present on the first network device, a POAP script file;

determining if a bootflash of the first device contains any images identified in the downloaded POAP script file;

second downloading, in response to a negative result of the determining, the images identified in the downloaded POAP script file;

creating, after the second downloading or a positive response to the first downloading, a configuration file to configure the first network device, comprising:
access a configuration database file corresponding to a network comprising a plurality of network devices including the first network device, wherein the configuration database file includes a file entry corresponding to each of the network devices;

access to file entry corresponding to the first network device using a device identifier of the first one of the network device as an index to the configuration database file, wherein the corresponding file entry includes configuration information for the first network device, the configuration information comprising information identifying a location of a configuration template file and at least one network parameter;

retrieve the identified configuration template file from the location identified in the corresponding file entry;

apply the at least one network parameter to the identified configuration template file to create a new configuration file; and rebooting the first one of the network device using the new configuration file;

wherein each of the network devices comprises a network switching element;

wherein the network is a Data Fabric Architecture ("DFA") network.

14. The apparatus of claim 13 wherein the device identifier is retrieved from the network device.

15. The apparatus of claim 13, wherein the device identifier comprises one of a serial number of the network device and a MAC address of the first network device.

16. The apparatus of claim 13, wherein the at least one network parameter comprises at least one of a hostname of the network device, a management interface IP address of the network device, a BGP IP address of the network device, and at least one server IP address for the first network device.

17. The apparatus of claim 13, wherein the configuration database file is stored in a centralized database.

* * * * *